United States Patent [19]

Kawakami et al.

[11] Patent Number: 4,971,695
[45] Date of Patent: Nov. 20, 1990

[54] SULFONATED HEXAFLUORO BIS-A POLYSULFONE MEMBRANES AND PROCESS FOR FLUID SEPARATIONS

[75] Inventors: James H. Kawakami, Piscataway, N.J.; Benjamin Bikson; Gertrud Gotz, both of Brookline, Mass.; Yurdagul Ozcayir, Nashua, N.H.

[73] Assignee: Union Carbide Industrial Gases Technology Corporation, Danbury, Conn.

[21] Appl. No.: 429,614

[22] Filed: Oct. 31, 1989

[51] Int. Cl.$^5$ .............................................. B01D 13/00
[52] U.S. Cl. ................................. 210/500.23; 55/16; 55/158; 210/500.41; 521/64
[58] Field of Search ...................... 210/500.41, 500.23; 55/16, 158; 521/64

[56] References Cited

U.S. PATENT DOCUMENTS

| | | | |
|---|---|---|---|
| 3,709,841 | 10/1977 | Quentin | 260/49 |
| 3,852,135 | 12/1974 | Cook Jr. | 210/500.41 |
| 3,855,122 | 12/1974 | Bourganel | 210/23 |
| 3,875,096 | 4/1975 | Graef et al. | 260/29 |
| 4,026,977 | 5/1977 | Bourganel | 264/41 |
| 4,054,707 | 10/1977 | Quentin | 428/213 |
| 4,207,182 | 1/1980 | Marze | 210/23 |
| 4,268,650 | 5/1981 | Rose | 525/534 |
| 4,273,903 | 6/1981 | Rose | 525/534 |
| 4,351,860 | 9/1982 | Yoshida et al. | 210/500.41 |
| 4,414,368 | 11/1983 | Coplan et al. | 525/534 |
| 4,508,852 | 4/1985 | Bikson et al. | 521/27 |
| 4,717,395 | 1/1988 | Chiao | 55/16 |
| 4,818,387 | 4/1989 | Ikeda et al. | 210/500.41 |
| 4,822,489 | 4/1989 | Nohmi et al. | 210/500.41 |

OTHER PUBLICATIONS

A. Noshay et al., "Sulfonated Polysulfone", J. App. Pol. Sci., 20 1885-1903 (1976).

*Primary Examiner*—Morton Foelak
*Attorney, Agent, or Firm*—Alvin H. Fritschler

[57] ABSTRACT

Sulfonated hexafluoro bis-A-polysulfone membranes of polymers and copolymers having the repeat unit of the structure;

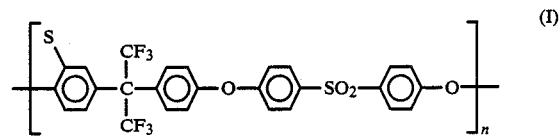

in the polymer molecule that exhibit improved permeation and separation characteristics and processes for the use thereof for separation of a component from a fluid mixture of said component in admixture with other components.

4 Claims, No Drawings

SULFONATED HEXAFLUORO BIS-A POLYSULFONE MEMBRANES AND PROCESS FOR FLUID SEPARATIONS

Field of the Invention

This invention relates to improved permeable membranes and to processes using said membranes for the separation of components in fluid mixtures. The improved membranes are the sulfonated hexafluoro bis-A polysulfone polymer and copolymer membranes containing the repeat unit of the general type of structure )in the molecule:

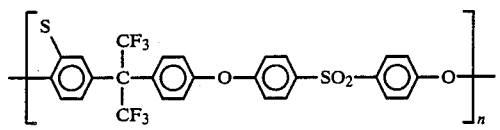
(I)

wherein S represents a sulfonic acid group or its salified form.

BACKGROUND OF THE PRIOR ART

Sulfonated permeable membranes capable of selectively permeating one component of a fluid mixture, either liquid or gas, from a mixture thereof with other components, are considered in the art as a convenient, potentially highly advantageous means for achieving components separations. For practical commercial operations such membranes must be capable of achieving an acceptable level of separation, or selectivity, of the desired component contained in the fluid feed stream while, at the same time, achieving a desirably high productivity, or permeability rate, of component separation.

Various types of permeable, or semipermeable, membranes are known in the art for carrying out a wide variety of fluids separations. Such membranes have been classified as being of the isotropic, composite, or asymmetric types, their structures being well known in the art.

This invention relates to certain sulfonated fluorinated polysulfones resins, their preparation and use; and more particularly to cation exchange resins derived from specific fluorinated polysulfones, membranes derived from such resins, and their application.

Sulfonated polysulfones are known in the art as useful, chemically resistant ion-exchange resins. The preparation of sulfonated polyarylether sulfones is described by J.P. Quentin in U.S. Pat. Nos. 3,709,841 and 4,054,707, and further examples of preparation of sulfonated polysulfones can be found in U.S. Pat. Nos. 4,268,650; 4,273,903; 4,414,368; and 4,508,852.

Additional disclosures on preparation of sulfonated polysulfone membranes can be found in U.S. Pat. Nos. 4,717,395; 4,207,182; 4,026,977; 3,875,096; and 3,855,122.

In an article by A. Noshay and L.M. Robeson, "Sulfonated Polysulfone", J. App. Pol. Sci., 20, 1885-1903 (1976), the use of a sulfur trioxide/triethyl phosphate complex as the sulfonating agent is reported.

Among the polymers known to be useful permeable membrane materials are the sulfonated bisphenol-A polysulfones having the polymer repeat unit:

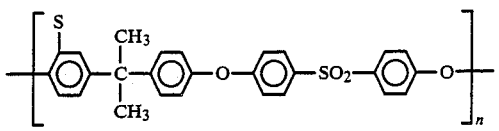

It has now been discovered that when the

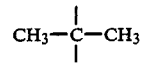

radical in the polymer backbone is replaced by the

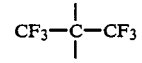

radical, substantial improvements in membrane forming characteristics, in chemical durability and in gas permeation rate occur to provide membranes with unexpected and unpredictable improved permeation and separation characteristics.

The sulfonated polysulfone materials of this invention can be advantageously used in numerous membrane separation processes, such as gas separations, reverse osmosis and ultrafiltration processes; electrochemical membrane separations, such as electrodialysis as a dialysis membrane; and as battery separator membranes.

SUMMARY OF THE INVENTION

This invention pertains to an improved sulfonated fluorinated polysulfone membrane that exhibits unexpected and heretofore unpredictable permeability and selectivity properties as compared to its non-fluorinated analog, and to processes for the use of such membranes for the separation of one component of a fluid mixture from a mixture of said one component in admixture with other components. The sulfonated fluorinated polysulfone permeable membranes are polymers, including copolymers, having the polymer repeat unit of the following general type of structure in the molecule:

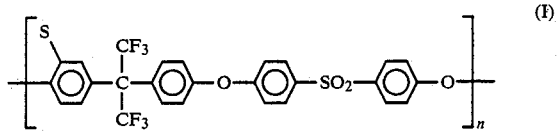
(I)

that are produced by the sulfonation of polymers and copolymers wherein at least about 50 mole percent of the polymer structure have the repeat unit of the following general structure:

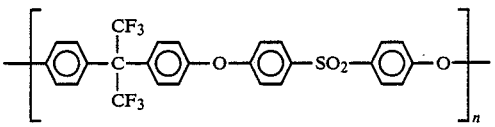

In the above formulas S is the sulfonic acid group or its salified form and n represents the average number of polymer repeat units in the molecule. The salified form can typically contain an ammonium group, an alkali metal atom, an alkaline earth metal atom, a transition metal atom or an organic cation group.

DETAILED DESCRIPTION OF THE INVENTION

This invention comprises an improved process for separating a component from a fluid mixture. In the process of this invention it was found that unexpected and unpredictable high permeation rates and selectivities were obtained by the use of permeable membranes of certain sulfonated fluorinated polysulfone polymers as compared to the non-fluorinated polymers. The sulfonated fluorinated polysulfone polymers, including copolymers, used to produce the permeable membranes useful in the process of this invention have the sulfonated hexafluoro polymer repeat unit of the structure:

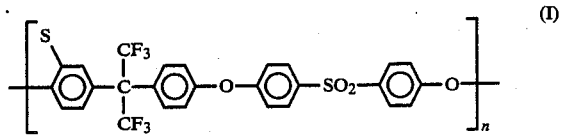

wherein S represents the sulfonic acid group or its salified form and n represents the average number of polymer repeat units in the polymer molecule. The number of n units present is such that the average molecular weight of the polymer molecule is generally above about 10,000, preferably from about 25,000 to about 80,000. Some typical copolymers of sulfonated polysulfones of this invention can be prepared by sulfonating polysulfone copolymers of hexafluorinated bisphenols with non-fluorinated conventional bisphenol-A, hydroquinone or other non-fluorinated bisphenols, wherein at least 50 mole percent of the copolymer molecule is represented by the hexafluorinated bisphenol A polysulfone. It was found that the permeability of membranes of sulfonated hexafluoro polymers (I) containing the

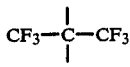

group showed a multi-fold increase in gas permeability as compared to the permeability of non-sulfonated membranes in which the

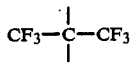

group was replaced by a

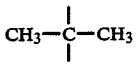

group, as seen by the results obtained in Example 3. The substantial increases in permeability of the sulfonated hexafluorinated polysulfone membranes (I) were completely unexpected and unpredictable. It was also found that the sulfonated hexafluoro polymers (I) were more readily soluble in solvents conventionally used in the deposition of ultra-thin coatings in the production of composite membranes, e.g., composite porous hollow fiber membranes, thus enabling the production of more uniformly coated and efficient composite membranes. The sulfonated fluorinated polymers (I) of this invention were also found to be more durable than the non-fluorinated Bis-A polysulfones known in the art.

Sulfonated polysulfone polymers of this invention can be prepared by sulfonation methods known in the art; see, for example, U.S. Pat. No. 3,709,842, wherein Quentin describes a preparation of polymers in which part of the aromatic rings are substituted with hydroxysulfonyl radicals (—SO$_3$H, also called sulfonic groups). Additional methods can be found in E.E. Gilbert, "Sulfonation and Related Reactions", R.E. Krieger Publishing Co., NY (1977) and A. Noshay and L.M. Robeson, J. of Applied Polymer Science, V20, p. 1885 (1976). In general, the sulfonation may be carried out by simple admixture of a solution or suspension of the polysulfone with a sulfonation agent in an inert solvent system. Sulfur trioxide, chlorosulfonic acid and oleum are representative sulfonation agents. The temperature at which sulfonation takes place in less critical for polysulfone polymers of this invention due to good chemical resistance towards degradation. An advantageous temperature is within the range of from −25° C. to +80° C., preferably from 0° C. to +50° C. The sulfonated product polymer is usually separated from the reaction mixture by conventional techniques such as filtration, washing and drying.

The sulfonated polysulfone product of this invention of formula (I) is shown to have sulfonate groups on phenyl moiety,, distal to the sulfone linking group. Although substitution at these locations theoretically occurs first, it will be appreciated by those skilled in the art that the sulfonate groups may substitute at other positions and in other phenyl moieties of the polymer during sulfonation.

The, degree of substitution, DS, of the sulfonated hexafluoro polymers (I) is a measure of the average number of polymer repeat units present in the polymer composition that have been sulfonated. Typically the degree of substitution is on average from about 0.2 to about 4, preferably from about 0.5 to about 2. Thus, if on average half of the polymer repeat units (I) are sulfonated, the degree of substitution is 0.5.

The fluid separation membranes used in the processes of this invention can be of dense film or of any form known to those skilled in the art. Further, it can be a composite membrane, an asymmetric membrane, or a homogeneous or isotropic membrane. The membranes may be in spiral form, flat sheet, or other configurations, as well as in hollow fiber or tubular form. Those skilled in the art are aware of the many methods available for their production and know how to prepare the membranes in any of these forms.

The isotropic and asymmetric type membranes used in the process of this invention are generally comprised essentially of a single permeable membrane material, the sulfonated hexafluoro bis-A polysulfone polymer containing the polymer repeat unit of structure (I), which is capable of selectively separating at least one component from a fluid mixture containing said at least one component in admixture with other components. Asymmetric membranes used in the process of this invention are distinguished by the existence of two or more morphological regions within the membrane structure; one such region comprising a thin relatively dense semipermeable skin capable of selectively permeating at least one component from a fluid mixture containing said at least one component in admixture with other components, and the other region comprising a less dense, porous, essentially non-selective support region that serves to preclude the collapse of the thin skin region of the membrane during use. Composite membranes generally comprise a thin layer or coating of a suitable semipermeable membrane material, the sulfonated hexafluoro bis-A polysulfone polymer containing the polymer repeat unit of structure (I), superimposed on a porous substrate.

The sulfonated fluorinated polysulfones containing the repeat unit (I) of this invention can be used as a pure membrane forming material, an admixture of several sulfonated polysulfones, or in a mixture with other organic or inorganic materials. The sulfonated fluorinated polysulfones will typically represent more than 50 percent by weight of the composition of the membrane material and preferably more than 70 percent by weight of the composition of the membrane material. Some typical examples of inorganic materials that can be used in a mixture with sulfonated fluorinated polysulfones are inorganic acids, such as sulphuric or phosphoric acid. Organic materials useful as admixtures with the sulfonated fluorinated polysulfones can be high molecular weight polymers that can be neutral or can contain ionic groups, e.g., polyvinyl pyridine, polyethylene imine, polyethylene glycol, polypropylene glycol, etc., or low molecular weight materials and plasticizers, for example, organic salts, polyhydric alcohols such as glycerine, low molecular weight amines such as ethylenediamine, diethylene triamine, acridine, piperazine, pyridine, etc.

Flat sheet membranes are readily prepared from solutions of the sulfonated hexafluoro bis-A polysulfone polymer containing the polymer repeat unit of structure (I) in a suitable solvent, e.g. methoxyethanol, dimethylformamide, and the like, by casting the solution and evaporating the solvent, and thereafter drying and curing the cast film, either under vacuum, at elevated temperature, or a combination of both. Such thin film membranes can vary in thickness from about 0.5 mil to about 10 mils or more, preferably from about 1 mil to about 3 mils.

Flat sheet membranes are not, however, the preferred commercial form for gas separation applications or reverse osmosis. In large scale commercial applications hollow fiber permeable membranes are generally more desirable because they provide a significantly larger surface area per volume unit when fabricated as modules. The composite hollow fiber membranes that comprise a porous hollow fiber support having a permeable membrane layer on the surface thereof are advantageously used for fluid separations. The methods for their production are well known (See for example, "Hollow Fibers Manufacture and Applications", ed. J. Scott, Noyes Data Corporation, N.J., 1981, p. 264 et seg.). Porous hollow fiber polysulfone substrates are particularly useful in the preparation of composite membranes. Porous polysulfone hollow fibers are produced from solutions of the polysulfone in a solvent/nonsolvent mixture, as is known in the art, using the procedure described by 1. Cabasso et al. in "Composite Hollow Fiber Membranes", Journal of Applied Polymer Science, 23, 1509–1523 and in "Research and Development of NS-1 and Related Polysulfone Hollow Fibers For Reverse Osmosis Desalination of Seawater" PB 248,666, prepared for the Office of Water Research and Technology, Contract No. 14 30 3165, U.S. Department of the Interior, July 1975. The well known tube-in-tube jet technique was used for the spinning procedure, with water at about room temperature being the outside quench medium for the fibers. The quench medium in the center bore of the fiber was air. Quenching was followed by extensive washing to remove pore forming material. Following the wash, the hollow fibers were dried at elevated temperature by passage through a hot air drying oven.

The sulfonated hexafluoro bis-A polysulfone separation membranes used in the processes of this invention exhibit high gas separation characteristics for hydrogen over methane, carbon dioxide over methane and oxygen over nitrogen coupled with good permeation rates or flux. The ability of these membranes to separate these components with such high combination of separation and permeation characteristics was completely unpredictable and unexpected and is superior to the results often exhibited by sulfonated polysulfones in the prior art. As shown in Example 3, the use of sulfonated hexafluoro bis A polysulfone (F6-Bis A-SPS) membranes of this invention showed significantly higher permeation rates than are achieved when using the non fluorinated sulfonated bis-A polysulfone ) (BisA-SPS) membrane in the separation process. The data in Example 3 show the F6-BisA-SPS membranes have a helium permeability about 4 times greater, and oxygen permeability about 6 times greater than the permeabilities of the Bis A-SPS membranes; results that were completely unexpected and unpredictable.

The fluid mixtures that are separated by the membranes of this invention can be liquid, gaseous, mixtures thereof, or either an admixture of suspended particles. Typical gas mixtures are air, mixtures comprising hydrogen/nitrogen, hydrogen/methane, oxygen/nitrogen, ammonia/nitrogen, carbon dioxide/oxygen, carbon dioxide/methane, hydrogen sulfide/methane, etc. Typical liquid mixtures are salt and dye water solutions, suspensions of oil in water, sugar solutions, etc.

Unless otherwise indicated intrinsic permeability and selectivity of the polymers were determined using flat sheet membranes. These membranes were prepared from solvent solutions of the polymer by casting on a glass plate to form membranes about 1 to 3 mils thick and air dried. The air dried membranes were stripped from the glass plates and dried in a vacuum oven at 70° C for one week. The dried membranes were sandwiched between two aluminum foils exposing a 2.54 cm diameter area, placed in a permeation cell and sealed with epoxy resin. The downstream side of the cell was evacuated up to about $2 \times 10^{-2}$ mm Hg and the permeate feed gas was introduced from the upstream side. The pressure of the gas permeated into the downstream side was measured using an MKS Barathon pressure transducer. The permeability coefficient P was calculated from the steady state gas permeation rate according to the equation:

$$P = C \times V \times L \times \frac{\frac{dp}{dt}}{h}$$

-continued

C = constant
V = volume of collection receiver
L = thickness of membrane
h = upstream pressure
$\frac{dp}{dt}$ = slope of steady-state line To determine the intrinsic viscosity the reduced and inherent viscosities were measured at three different concentrations (0.40, 0.27 and 0.20 g/dl) and plotted. Each curve was extrapolated to zero. The intrinsic viscosity was determined as the intercept at the y axis. The measurements were carried out in Ubbelohde type viscometers at 25° C. The intrinsic viscosity of sulfonated samples was measured in 0.5 N NaClO4 dimethylformamide solvent mixture, while the intrinsic viscosity of unsulfonated polymers was measured in dimethylformamide or tetrahydrofuran.

The permeability coefficient P is reported in Barrer units, in which a Barrer is: $P = \text{Barrer} = 10^{-10} \times cm^3(STP)cm/cm^2.sec.cmHg$.

The following examples serve to illustrate the invention.

EXAMPLE 1

A—A reactor flask equipped with a stirrer, addition funnel and thermometer was charged with 10g of the polymer of 4,4'-[2,2,2-trifluoro (trifluoromethyl) ethylidene]bisphenol and 4,4'dichlorodiphenyl sulfone (hereinafter F6Bis-A-PS) comprising a plurality of polymer repeat units of the formula:

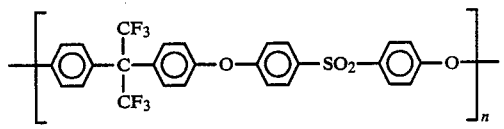

and 100 ml of methylene chloride and stirred at room temperature until dissolved. While still at room temperature a solution of 4.08 ml of chlorosulfonic acid in 36 ml of methylene chloride was added over a period of 15 minutes via an addition funnel. The contents of the flask were always maintained under an argon atmosphere. Within a short while the reaction mixture became cloudy and after stirring for two hours, at room temperature, a green taffy-like very viscous product resulted. The methylene chloride was decanted and the sulfonated polymer (hereinafter F6-BisA SPS) was washed three times with methylene chloride. The crude F6-BisA-SPS was dissolved in ethanol, under nitrogen, and rotoevaporated at 30° C to remove residual methylene chloride and then dialyzed to remove residual inorganic acids. The dialyzed product was rotoevaporated at 50° C and the vacuum dried at 50° C. The F6-BisA-SPS comprising a plurality of polymer repeat units of the formula:

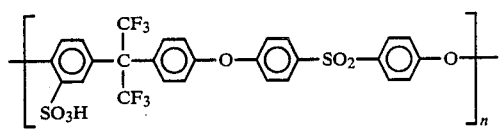

having the average DS indicated below was recovered (9.2g) as a fine granular material. The intrinsic viscosity of the F6-BisA-SPS was 0.58 dl/g compared with 0.59 dl/g for the precursor F6-BisA-PS starting material. The fact that the intrinsic viscosities are so close is clear evidence the polymer did not degrade during the sulfonation reaction. The ion exchange capacity (IEC) of the F6-BisA-SPS was 1.39 meq/g solids, H+form. The DS was 0.85 average sulfonic group per polymer repeat unit.

B—For comparative purposes a polybisphenol A ether sulfone (available commercially as UDEL 3500 sold by Amoco Performance Products, Inc.) (hereinafter BisA-PS) comprising a plurality of polymer repeat units of the formula:

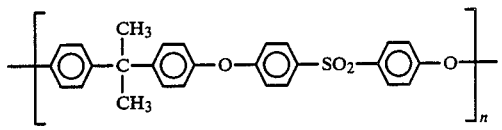

was sulfonated. A reactor flask equipped with a stirrer, addition funnel and thermometer was charged with 500 g of BisA-PS powder that had been dried at 150° C. for about 3 hours and 2,500 ml of methylene chloride and stirred at room temperature until dissolved. The solution was cooled to 5° C. and a solution of 97 ml of chlorosulfonic acid in 388 ml of methylene chloride was added at 5° C. over a period of 1.5 hours while maintaining an inert gas atmosphere. The reaction mixture was stirred an additional two hours at 5° C. The methylene chloride was decanted and the soft layer of the sulfonated polymer (hereinafter BisA-SPS) remaining in the flask was successively washed with six 1,000 ml portions of methylene chloride. The BisA SPS became more viscous with each successive wash. The crude BisA-SPS was dissolved in a mixture of 1,000 ml isopropanol and 75 ml of deionized water and a cloudy, gold colored solution was obtained after stirring for less than 30 minutes. The solution was rotoevaporated to remove residual methylene chloride solvent and vacuum dried at 50° C to a constant weight of 567 g (94% yield). The BisA-SPS comprising a plurality of polymer repeat units of the formula:

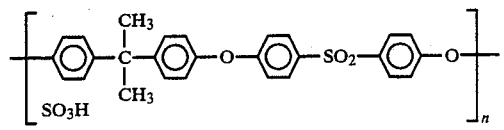

having the average DS indicated below was a white rock-like, very hard material and had to be crushed to powder form by rolling in a ball mill for three days. The intrinsic viscosity of the BisA SPS was 0.27 dl/g compared to 0.39 dl/g for the precursor BisA-PS starting material. The fact that the intrinsic viscosity decreased so significantly is clear evidence the polymer suffered significant degradation during the sulfonation reaction even at the low sulfonation temperature used in an attempt to minimize polymer degradation. The ion exchange capacity of the BisA-SPS was 1.18 meg/g solids, H+ form. The DS was 0.6, average, sulfonic group per polymer repeat unit.

EXAMPLE 2

A—A liter, 4 neck flask equipped with a stirrer, thermometer, nitrogen inlet tube and addition funnel was charged with 25g of F6-BisA-PS and 250 ml of methylene chloride and stirred at room temperature until dissolved. It was cooled to −4° C. and a solution of 10.2 ml of chlorosulfonic acid in 90 ml of methylene chloride was added via the funnel over a 15 minute period. After stirring at −4° C. to 3° C. the temperature was allowed to rise to room temperature; after stirring for about two hours the methylene chloride was decanted. The reaction was carried out under a nitrogen atmosphere. The crude F6-BisA-SPS was washed three times at room temperature with 250 ml portions of methylene chloride to yield a taffy like F6-BisA-SPS. This was dissolved in 90/10 isopropanol/water solution and precipitated by pouring into hexane. A white, sticky, clumpy product was obtained that was redissolved in methanol, dialyzed, rotoevaporated and vacuum dried at 50° C.; and recovered (20.5g) fine granular F6-BisA-SPS. The intrinsic viscosity was 0.48 dl/g. The IEC was 1.18 meg/g solids, $H^+$ form. The DS was 0.7, average, sulfonic group per polymer repeat unit.

B—Membranes were cast from dimethylformamide solutions of the F6-BisA-SPS from Part A, above. After drying in a vacuum oven at 70° C. for a week, the membranes were converted into salified forms as shown in C. and D., below.

C—Membranes prepared as shown in B were left in a one molar solution of $CO(NO_3)_2$ overnight. After rinsing with deionized water several times, the membranes were dried in a vacuum oven at 110° C. overnight.

D—Membranes prepared as shown in B were left in an ammonia atmosphere overnight. After thorough flushing with nitrogen, the membranes were used for permeation experiment.

The permeation results are set forth in Table I. The membrane in ionic form $H^+$ also appears in Table III.

TABLE I

| Ionic Form | $H^+$ | $Co^{++}$ | $NH_4^+$ |
| --- | --- | --- | --- |
| Helium permeability coefficient [a] | 19.8 | 26.8 | 24.9 |
| Oxygen permeability coefficient | 0.9 | 1.17 | 1.24 |
| Nitrogen permeability coefficient | 0.13 | 0.18 | 0.19 |
| $\alpha$ $O_2/N_2$ | 6.9 | 6.4 | 6.5 |
| $\alpha$ $He/N_2$ | 151 | 153 | 131 |

[a] Permeability coefficients in barrers, measured at 30° C.

As shown in the data the cation form of the sulfonic group has an effect on permeation coefficient and separation factor.

EXAMPLE 3

A—A four liter reactor was charged with 250 g of BisA-PS and 2,500 ml of methylene chloride and dissolved under nitrogen and cooled to −4° C. Over a period of thirty minutes a solution of 48.5 ml of chlorosulfonic acid in 430 ml of methylene chloride was added at about −2° C. to about −4° C., followed by stirring for another hour. During the reaction 300 ml of methylene chloride was added to replace that which had evaporated; throughout the reaction a nitrogen atmosphere was maintained. The reaction was terminated by adding 50 ml of a 95/5 solution of methanol/water to destroy residual chlorosulfonic acid and then solvent was decanted followed by rotoevaporation at 30° C. to remove methylene chloride. The crude BisA SPS was dissolved in 850 ml dimethylformamide and precipitated by pouring into a 10 fold excess of isopropanol, filtered, washed with isopropanol and vacuum dried at 50° C. to yield 275 g of purified, clumpy BisA-SPS. The intrinsic viscosity was 0.35 dl/g. The IEC was 1.02 meg/g solids, $H^+$ form. The DS was 0.5, average, sulfonic group per polymer repeat unit.

B—Flat film membranes were cast from dimethylformamide and permeability and selectivity determined, as described supra. The permeation results obtained with these BisA-SPS membranes having a DS of 0.5 are compared with the F6-BisA-SPS membranes of part A of Example 2, which have a DS of 0.7 in Table II. The data show the F6-BisA-SPS membranes have a helium permeability about 4 times greater, an oxygen permeability 6 times greater than those of the BisA-SPS membranes produced with the non-fluorinated BisA-SPS polymer of part A of this Example 3, showing the unexpected and unpredictable benefits achieved when using a fluorinated F6 -Bis A-SPS polymer membrane.

TABLE II

| Membrane Material | BisA-SPS | F6-BisA-SPS |
| --- | --- | --- |
| DS | 0.5 | 0.7 |
| Helium permeability coefficient [a] | 4.8 | 19.8 |
| Oxygen permeability coefficient | 0.15 | 0.9 |
| Nitrogen permeability coefficient | 0.022 | 0.13 |
| $\alpha$ $O_2/N_2$ | 6.8 | 6.9 |
| $\alpha$ $He/N_2$ | 220 | 151 |

[a] Permeability coefficients in barrers, measured at 30° C.

EXAMPLE 4

A—A four liter reactor was charged with 200 g of F6-BisA-PS and 2,000 ml of methylene chloride and stirred under nitrogen. The solution was cooled to −4° C. and over a period of thirty minutes a solution of 47.9 ml of chlorosulfonic acid in 430 ml of methylene chloride was added. The reactor contents were heated to about 20–25° C. and stirred, under nitrogen, for five hours, The reaction was terminated by decanting the methylene chloride, and washing the solid polymer with three 2,000 ml portions of methylene chloride. The crude F6-BisA-SPS was slurried in two liters of ethanol plus 60 ml of water overnight, then rotoevaporated at 30° C. and vacuum dried for two days at 30° C.; yield was 203 g of purified F6-BisA-SPS having an odor of hydrochloric acid, half of the sulfonated reaction product was dialyzed and recovered. The DS of the F6-BisA-SPS produced was 0.4, average, sulfonic group per polymer repeat unit. The IEC was 0.74 meg/g solids, $H^+$ form.

B—Flat film membranes were cast from dimethylformamide solution of the undialyzed F6-BisA-SPS and permeability and selectivity determined as described supra. The permeation results are set forth in Table III.

EXAMPLE 5

A—A reactor was charged with 125g of F6-BisA-PS and 1,250 ml of methylene chloride and stirred under nitrogen. The solution was cooled to −6° C. and over a period of 45 minutes a solution of 37.5 ml of chlorosulfonic acid and 337 ml of methylene chloride was added. The reactor contents were allowed to warm to room temperature with stirring for six hours total time. The methylene chloride was decanted and the solid crude F6-BisA-SPS was washed with three 1,000 ml portion of methylene chloride, dissolved in one liter of ethanol and rotoevaporated to remove residual methylene chloride and dried. Yield of F6-BisA-SPS was 144 g, intrinsic viscosity was 0.55 dl/g. The IEC was 1.34 meq/g solids, H+ form. The DS was 0.83.

B—Flat film membranes were cast from a dimethylformamide solution and permeability and selectivity determined, as described supra. The permeation results are set forth in Table III; DS of 0.83.

As seen from the data as the DS increases from 0.4 to 0.83 the permeation decreases for the three gases evaluated, helium, oxygen and nitrogen; however, the separation factors of $O_2/N_2$ and $He/N_2$ increase.

TABLE III

EFFECT OF DEGREE OF SUBSTITUTION ON PERMEATION PROPERTIES OF F6-BISA-SPS

| Degree of substitution | 0.4 | 0.7 | 0.83 |
|---|---|---|---|
| Helium permeability coefficient [a] | 20 | 19.8 | 14.97 |
| Oxygen permeability coefficient | 1.07 | 0.9 | 0.54 |
| Nitrogen permeability coefficient | 0.17 | 0.13 | 0.075 |
| α $O_2/N_2$ | 6.32 | 6.9 | 7.1 |
| α $He/N_2$ | 118 | 151 | 197 |

[a] Permeability coefficients in barrers, measured at 30° C.

EXAMPLE 6

Dry porous polysulfone hollow fibers prepared as described above were coated with F6-BisA-SPS polymer. The coating solution was prepared by dissolving one gram of F6-BisA-SPS having a DS of 0.7 and an IEC of 1.18 meq/g (Example 2 in 100 ml of methoxyethanol. The solution was then filtered through a 1.5 micron glass filter prior to coating. The coating solution was applied by passing the dry porous polysulfone hollow fibers through the coating bath by the procedure described in U.S. Pat. No. 4,467,001. The solvent was then evaporated by passing the coated fibers through a dryer oven. The temperature of the oven was 58° C. and the residence time was 30 seconds. The dried composite porous polysulfone hollow fibers membranes were collected on a spool. The thus prepared composite membrane was tested for gas separation properties using a 70/30 hydrogen/methane feed gas composition at 200 psig and 25° C. The permeation rate of hydrogen was 0.88 ft$^3$ (STP)/ft$^2$·psi.day and the $H_2/CH_4$ selectivity was 154.

EXAMPLE 7

The example describes preparation and performance of composite reverse osmosis membranes. The composite membranes were prepared by a coating process essentially as described in Example 6, except that the coating solution was prepared by dissolving 1.5 grams of F6-BisA-SPS of ion-exchange capacity of 1.41 meq/g in 100 ml of ethanol. The coating was applied to polysulfone hollow fibers and dried at 130° C.

The composite hollow fiber membranes prepared as described above were found to be useful in a reverse osmosis water desalination process. The membranes exhibited flux of 3.7 gfd combined with 90% salt rejection of simulated seawater composition at a pressure of 1000 psi (25° C.).

What is claimed is:

1. A permeable separation resin membrane comprising a polymer or copolymer containing the polymer repeat unit represented by the structure:

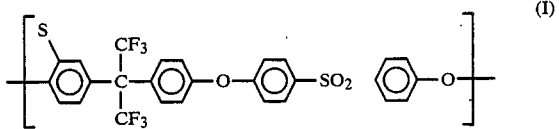

in the polymer molecule wherein S is the sulfonic acid group or its salified form, said polymer or copolymer has a molecular weight above about 10,000 and a degree of substitution of S groups of from about 0.2 to about 4.

2. A membrane comprising the resin claimed in claim 1, said membrane showing improved permeation and separation characteristics.

3. A membrane as claimed in claim 2 wherein at least about 50 percent by weight of said membrane comprises said polymers or copolymers containing said repeat unit (I).

4. A membrane as claimed in claim 2 wherein said polymer or copolymer has a molecular weight of from about 25,000 to about 80,000 and a degree of substitution of from about 0.4 to about 1.5.

* * * * *